Nov. 2, 1971   MASAHARU TAJIMA   3,616,526
TOOL CHANGING DEVICE FOR A MACHINE TOOL
Filed Feb. 26, 1969   6 Sheets-Sheet 1

INVENTOR.
MASAHARU TAJIMA
BY
ATTORNEYS

INVENTOR.
MASAHARU TAJIMA

INVENTOR.
MASAHARU TAJIMA

Nov. 2, 1971     MASAHARU TAJIMA     3,616,526
TOOL CHANGING DEVICE FOR A MACHINE TOOL
Filed Feb. 26, 1969     6 Sheets-Sheet 5

INVENTOR.
MASAHARU TAJIMA
BY
Wenderoth, Lind & Ponack
ATTORNEYS

United States Patent Office 3,616,526
Patented Nov. 2, 1971

---

3,616,526
TOOL CHANGING DEVICE FOR A MACHINE TOOL
Masaharu Tajima, Kanagawa Prefecture, Japan, assignor to Ikegai Tekko Kabushiki Kaisha, Tokyo, Japan
Filed Feb. 26, 1969, Ser. No. 802,376
Claims priority, application Japan, Apr. 3, 1968, 43/21,483
Int. Cl. B23q 3/157
U.S. Cl. 29—568
4 Claims

ABSTRACT OF THE DISCLOSURE

A tool changing device for a machine tool. The device has a tool drum mounted on a tool drum mounting column which is different from the column that carries the headstock. A swing arm is pivotally connected to the headstock and a tool changing arm is rotatably mounted on the swing arm. The tool drum is synchronously moved with the headstock and the swing arm is adapted to transfer the tools between the tool drum and the main spindle of the headstock.

BACKGROUND OF THE INVENTION

In most of the hitherto used tool changing devices for machine tools, a tool drum carrying the necessary tools is mounted on a column together with the headstock and there is provided between the main spindle of the headstock and the tool drum a rotatable arm or the like. The rotatable arm moves the tool from the tool drum to the main spindle and vice versa.

However, in such a tool changing mechanism, when the tool drum is positioned above or close to the headstock, there is much interference between the tool drum and the work because the space necessary for operation is occupied by the tool drum. This often makes it impossible to make effective utilization of the space. Also, in such a case, the shape of the headstock is restricted by the tool drum, and in many cases, has to be made in a special form, as a result of which its universality is reduced and the size of the tool drum is restricted. Further, unless the tool drum and the headstock are moved simultaneously in order to avoid interference of the tool drum with the work, it is impossible to change the tools until the headstock returns to the location of the tool drum. Moreover, the headstock cannot be moved speedily because of its large weight.

In order to eliminate the above defects, there has been devised another type of machine tool in which the headstock and a tool drum are arranged separately, e.g. the tool drum is mounted on the back of the column, but such a machine has also such defects as requiring a longer time to change tools because of the longer distance between the tool drum and the headstock.

Also in the conventional machine tools provided with a tool changing device, it is necessary that they be made in special forms due to the restrictions in shape due to the presence of the tool changing mechanism, and they have a complicated construction because of the presence of the tool clamping mechanism, etc. This is due to the use of a tool changing mechanism which is not universally applicable to machine tools.

SUMMARY OF THE INVENTION

This invention relates to a machine tool, and more particularly to a tool or work changing device for a machine tool such as an automatic machine tool which requires changing of tools or work.

It is an object of the present invention to provide a tool or a work changing device, which eliminates the defects of the prior art changing devices.

A further object of the present invention is to provide a tool changing device which is universally applicable to machine tools so that a machine tool having any desired shape can be fitted with a tool changing device.

In accordance with the present invention, a changing device for changing tools is provided in which a tool drum is arranged on a column separate from the column on which the headstock is mounted, and the tool drum is driven separately from but synchronously with the headstock, and tools are moved between them by a swing arm, so that tools can be changed speedily by a changing arm provided on the swing arm.

In accordance with the present invention, by mounting the headstock and the tool drum on the respective columns the number of tools in the tool drum can be increased or decreased as desired.

Further, if the tool drum is mounted on a column separate from and obliquely positioned relative to the headstock column, interference between the work and the tool drum is decreased, and the tool changing arm can be swung between the main spindle and the tool drum. In addition, since no intermediate delivery means for delivering tools is required, the tool changing apparatus according to the present invention not only reduces the tool changing time, but also makes construction simpler.

Although the present invention is explained hereinafter with reference to a changing device for changing tools in a machine tool, it will be understood by those skilled in the art that the present invention can be equally applied to a changing device for changing work pieces in a machine tool.

BRIEF DESCRIPTION OF THE DRAWING

These and other objects of this invention will become more readily apparent from the following specification and the accompanying drawings, in which.

DESCRIPTION OF THE PREFERRED EMBODIMENTS

Figure 1:
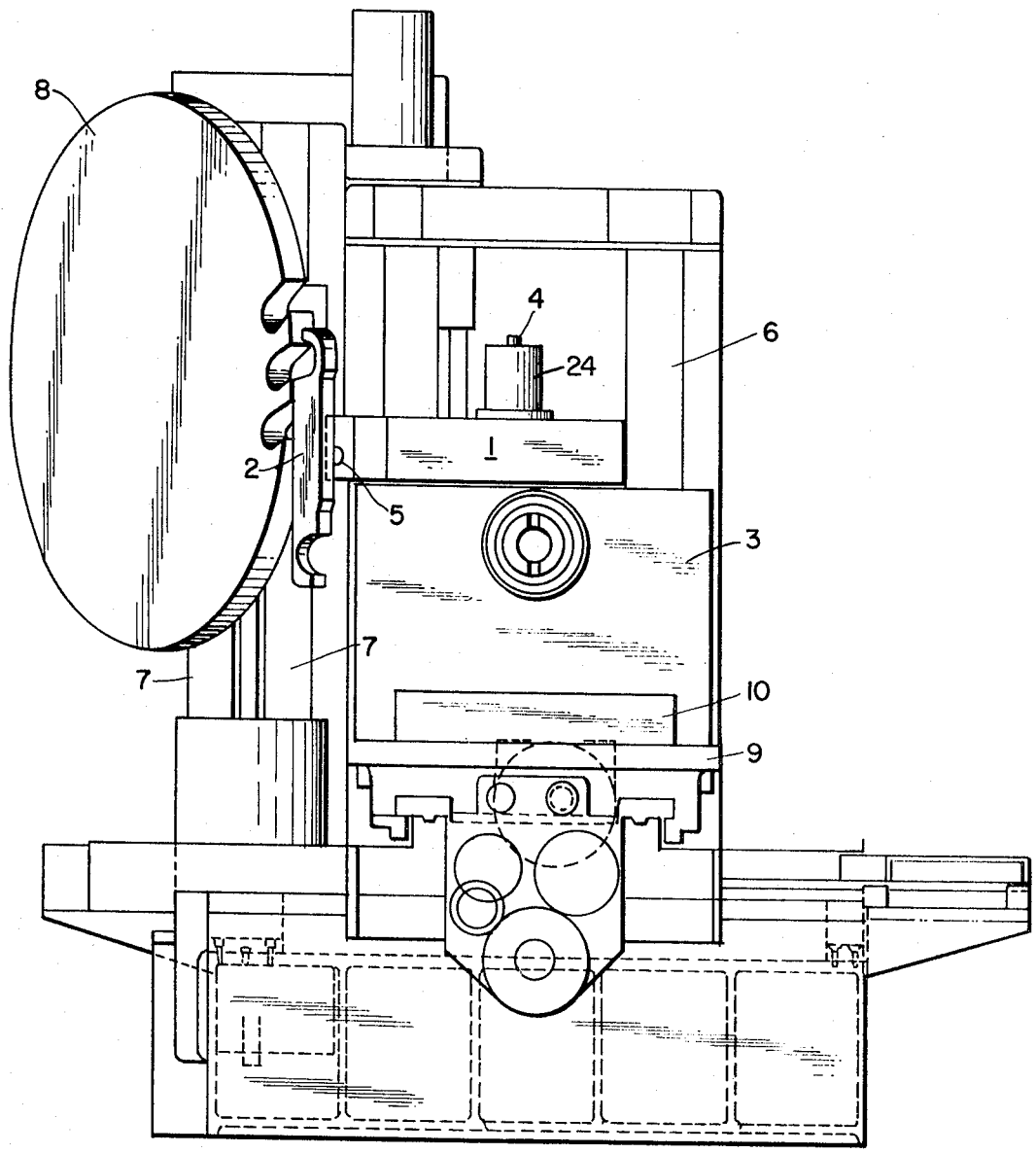
FIG. 1 is an elevational view of a machine tool provided with a tool changing device according to the present invention.
Figure 2:
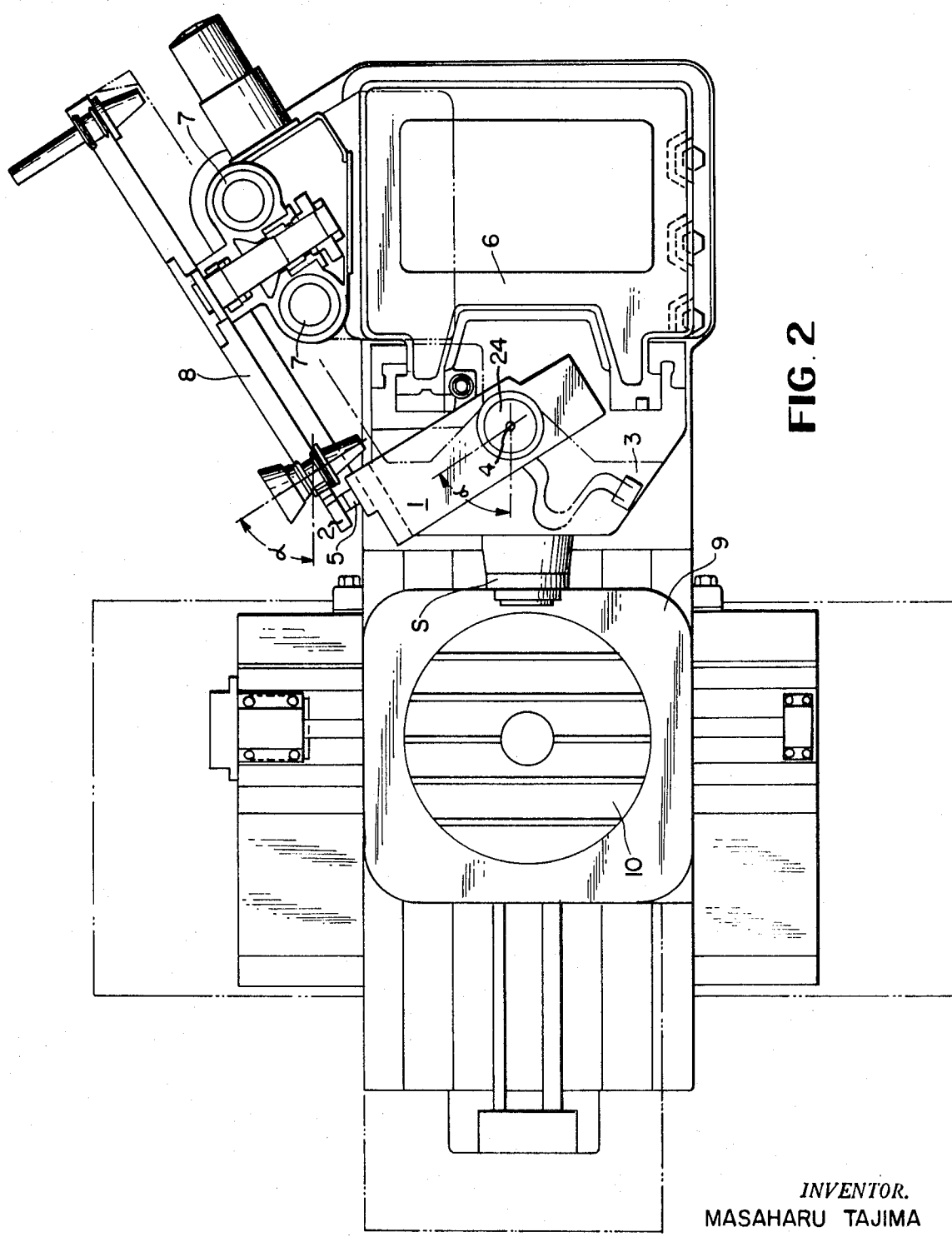
FIG. 2 is a plan view of the machine tool with the tool changing device shown in FIG. 1.
Figure 3:
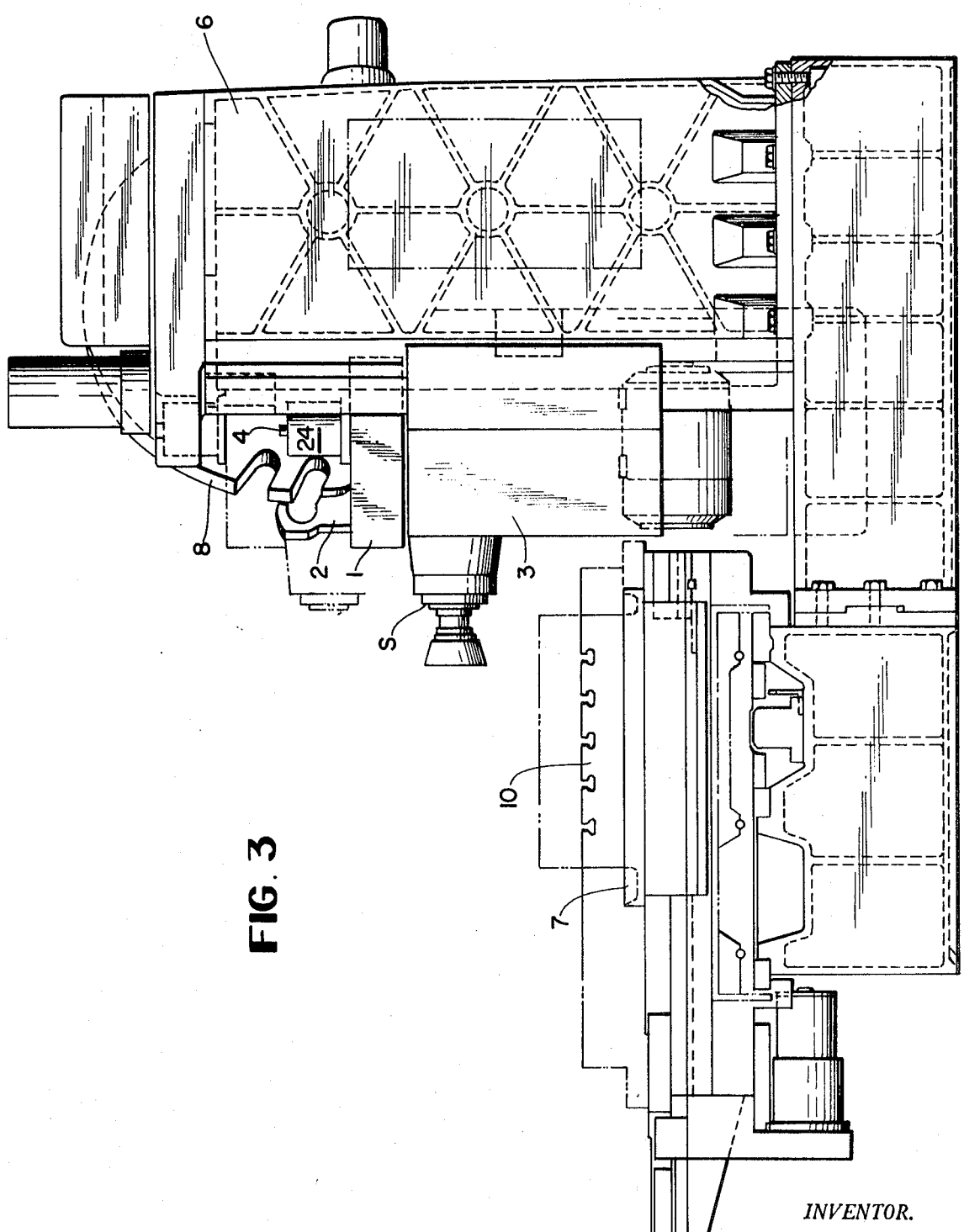
FIG. 3 is a side view of the machine tool with the tool changing device shown in FIG. 1 as viewed from the right side.

Referring to FIGS. 1–3 of the drawings, there is shown a machine tool provided with a tool changing device according to the present invention. A swing arm 1 is rotatably mounted on a headstock 3 on a pivot 4, and a tool changing arm 2 is rotatably mounted on the swing arm 1 on a rotatable shaft 5. The tool changing arm 2 has conventional tool clamping devices (not shown) of any known type at both ends. The headstock 3 is slidably mounted on the front surface of a column 6 so as to move up and down therealong, and on a separate column having two vertical posts 7 there is rotatably mounted a tool drum 8 the plane of rotation of which is obliquely positioned relative to the axis of the headstock spindle 5. Accordingly, the axial direction of the tool held by the tool drum is oblique with respect to the axis of the headstock spindle. Headstock 3 and the tool drum 8 have drive means (not shown) connected to them for synchronously moving them up and down so as to keep them in a definite positional relationship to each other. On a bed 9 is mounted a table 10 disposed in front of the column 6 to which table 10 is secured the work to be machined. The bed 9 is in turn mounted on conventional longitudinal and transverse moving means.

The details of the construction of the swing arm 1 and the tool changing arm 2 according to the present invention will be explained hereinafter with reference to three embodiments thereof.

Figure 4:
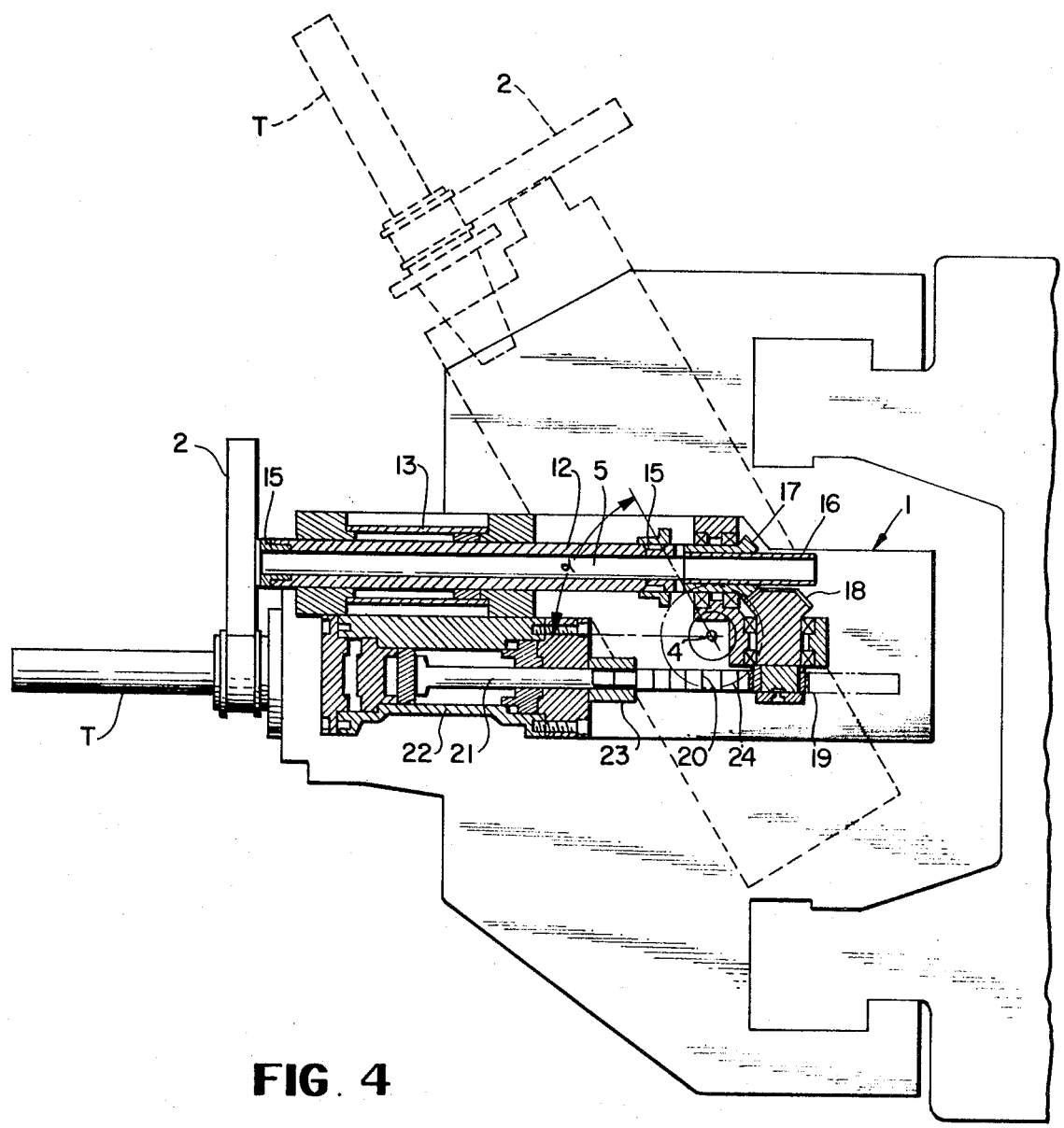
FIG. 4 is a partial sectional view of one embodiment of a swing arm.
Figure 5:
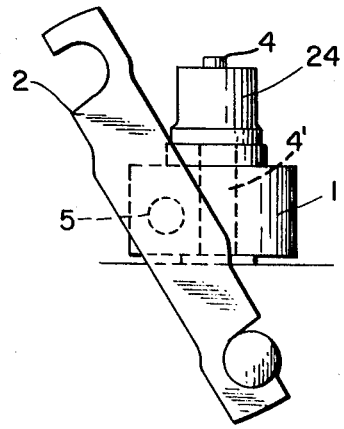
FIG. 5 is a diagrammatic view showing the relative positions of the swing arm and a tool changing arm of the embodiment shown in FIG. 4.

FIG. 4 shows a first embodiment of the swing arm in which the tool changing arm 2 mounted on the swing arm 1 on the rotatable shaft. The rotatable shaft 5 is mounted in a hollow piston rod 12 which extends along arm 1. Thus the rotatable shaft 5 and the hollow piston rod 12 constitute two telescoping members, the outer one of which is the hollow piston rod 12 slidable in a cylinder 13 for fixing and releasing tools, and the inner one of which is the rotatable shaft 5. The free end of the rotatable shaft 5, which is journaled within the hollow piston rod 12 on a pair of needle roller bearings 15 with thrust ball bearings at both ends, has a spline 16 on its outer surface, to which is slidably splined a boss of a bevel gear 17. The bevel gear 17 meshes with another bevel gear 18 which has a pinion 19 at its other end. The pinion 19 meshes in turn with a rack 20 that is connected to a piston rod 21 of a double cylinder 22 by a coupling 23. Thus, by use of a direct actuating type cylinder such as the double cylinder 22, it is possible to produce either a short stroke or a long stroke, which, by rotations of bevel gears 18 and 17, results in rotations of the tool changing arm 2 through 30 degrees or 180 degrees, respectively. This rotation of the tool changing arm 2 is combined with the projecting or retracting motion of the rotatable shaft 5 and the hollow piston 12 brought about by the actuation of the cylinder 13 so that the tool changing operation is effected. The swing arm 1 is adapted to be rotated about the pivot 4 by a rotating cylinder 24.

Figure 6:
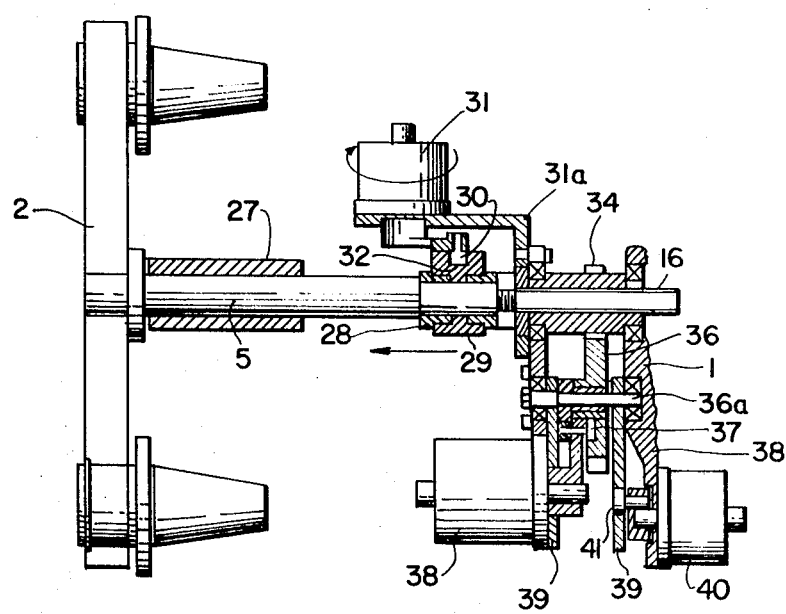
FIG. 6 is a partial sectional view of another embodiment of a swing arm.

FIG. 6 shows a second embodiment of the swing arm according to the present invention.

The rotatable shaft 5 in this embodiment supports the tool changing arm 2 and is journaled in a member 27 extending along the arm 1.

Figure 7:
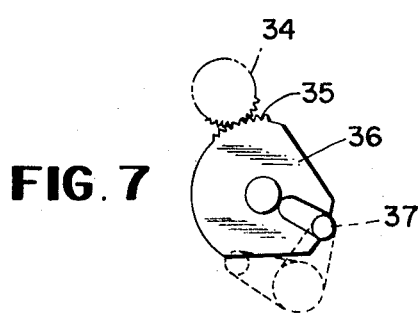
FIG. 7 is a plan view of a cam plate meshing with a gear of the embodiment shown in FIG. 6.

Fixedly secured to the mid portion of the rotatable shaft 5 by a bushing 28 is a cam 29 having a cam groove 32 therein which is engaged by a cam follower 30 forming part of a revolving cylinder 31 mounted on bracket 31a on the arm 1. Upon actuation of the revolving cylinder 31 through 180 degrees, the cam 29 is moved to the right or left to shift the rotatable shaft 5 longitudinally in the direction of its axis so that the tool changing arm 2 is given a reciprocal motion for engaging or releasing tools. A spline 16 formed on the outer periphery of the free end of the rotatable shaft 5 engages with the boss of a spur gear 34, which is journaled in arm 1 and which meshes in turn with the teeth 35 on a cam plate 36, as shown in FIG. 7. The cam plate 36 is pivoted on a shaft 36a journaled in arm 1 and is rotated by a cam follower 37 which is engaged therewith and which is driven by a rotating cylinder 38. Rotation of the cam follower 37 is transmitted to the rotatable shaft 5 through the spur gear 34 and the teeth 35 thereon so that the tool changing arm 2 is rotated through 180 degrees. The rotating cylinder 38 is mounted on supporting plates 39 which in turn are rotated by a roating cylinder 40 mounted on arm 1 and having a cam follower 41 driven thereby and engaging one of the plates 39. Upon rotation of the rotating cylinder 40, the tool changing arm 2 is rotated through 30 degrees through the supporting plates 39 and the cam plate 36.

Figure 8:
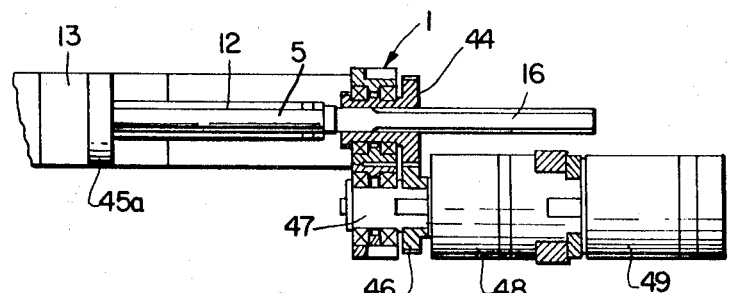
FIG. 8 is a partial sectional view of a further embodiment of a swing arm.
Figure 9:
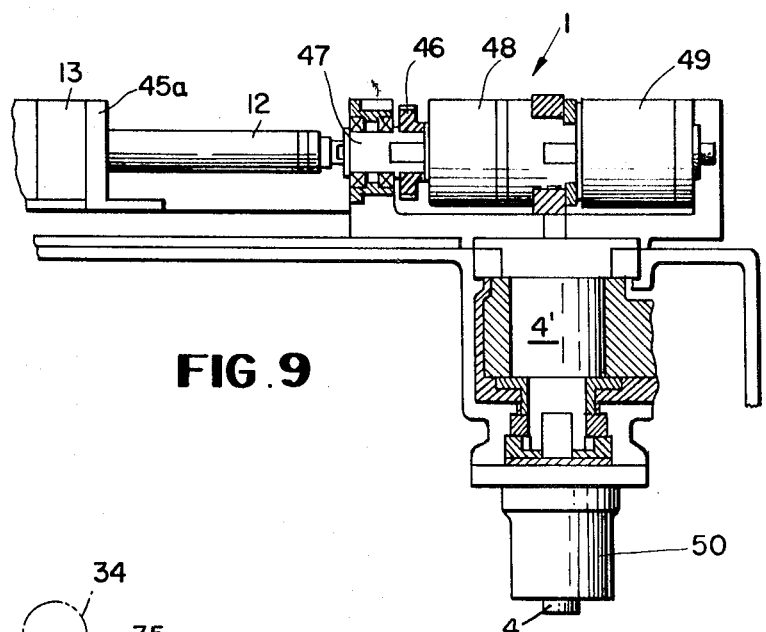
FIG. 9 is a partial vertical sectional view showing driving mechanisms for the swing arm shown in FIG. 8.

FIGS. 8 and 9 show a third embodiment of the swing arm according to the present invention. A spline 16 formed on the outer periphery of the free end of the rotatable shaft 5 which carries the tool changing arm 2 is engaged in the boss of a spur gear 44 journaled in arm 1 and is shiftable in its axial direction for fixing or releasing tools by a cylinder 13 mounted on bracket 45a on arm 1. The piston is the same as piston cylinder 12, 13 of FIG. 4. A spur gear 46 meshing with the spur gear 44 is keyed to a shaft 47 journalled in arm 1 and connected to a 30 degree revolving cylinder 48 and a 180 degree revolving cylinder 49 also mounted on arm 1. The cylinders 48 and 49 are connected in tandem, and, upon actuation of the cylinder 48 or 49, the rotation is transmitted through spur gears 46 and 44 to the spline 16 to rotate shaft 5 through 30 degrees or 180 degrees. FIG. 9 shows a partial sectional view of the swing arm 1 shown in FIG. 8 viewed from the side, wherein a revolving cylinder 50 for rotating the swing arm 1 is shown attached to the underside of the arm 1 for rotating it. In FIG. 9, 4 denotes a pivot corresponding to that shown at 4 in FIG. 4, the revolution of revolving cylinder 50 being transmitted to swing arm 1 through swing shaft 4' that supports swing arm 1.

The column 7 can be disposed relative to the axis of headstock spindle S so that the plane of the tool drum 8 rotatably mounted thereon is at any desired angle up to 90 degrees with the spindle S.

In operation, the swing arm 1 swings about the pivot 4 and transfers a tool from the tool drum side to the headstock side. First, the tool changing arm 2 rotates through about 30 degrees to grasp a tool T which has been carrying out machining in the headstock spindle S, and draws the tool out of the spindle by sliding the rotatable shaft 5 and the piston rod 12 in the axial direction thereof. Upon rotation of the rotatable shaft 5 through 180 degrees, the end of the tool changing arm 2 grasping the tool which has finished the machining is replaced by the other end of the tool changing arm 2 which is grasping a new tool which has been taken from the tool drum. After sliding of the rotatable shaft 5 in the opposite axial direction to insert the new tool into the headstock spindle S, the tool changing arm 2 again rotates through about 30 degrees in the opposite direction and leaves the new tool in the headstock spindle. Then the swing arm 1 is swung to the dotted line position of FIG. 4 adjacent the tool drum. The swing arm 1 stops there and the tool changing arm 2 again rotates through about 30 degrees to put the tool which has been used into the tool drum. It then rotates through about 30 degrees in the opposite direction to leave the tool in the tool drum. Then the tool drum rotates to index the next tool to be used in the subsequent machining. The tool changing arm 2 again rotates through about 30 degrees so that it grasps this next tool to be used, in the subsequent machining and then rotates through about 30 degrees in the opposite direction to remove the next tool to be used in the subsequent machining from the tool drum. When the machining by the tool secured in the headstock spindle is finished, the swing arm 1 swings about the pivot 4 and moves back to the full line position of FIG. 4 above the headstock spindle and the tool changing operation is repeated.

With the tool axis being at a certain angle α to the center line of the headstock 3 and the pivot 4 on which the swing arm 1 is mounted being slightly offset from the axis of the main spindle S such that when the swing arm 1 is rotated to a position parallel with the main spindle axis a tool held on the end of the tool changing arm 2 will be rotated into alignment with the axis of the main spindle, the swing arm 1 takes a tool out of the tool drum or holder 8 or reinserts a tool into the tool drum or holder 8 at the tool takeout or reinserting position solely by the swinging of the swing arm 1 and rotation of the tool changing arm 2, and it is the sliding of the shaft 5 in the swing arm that makes it possible to draw a tool out of the main spindle S or insert it into the main spindle S.

Accordingly, the swing angle of the swinging arm is established by the cylinder 24 so as to be exactly identical with the angle α made between the center line of the main spindle and the axis of the tool at the tool take-out or insertion at the tool holder.

Thus the tool is transferred from the tool drum or holder to the man spindle axis only through the swing motion of the swinging arm with the tool being grapsed by the tool changing arm, that is, the tool is moved between the tool taking out or insertion position at the tool drum to the tool inserting or drawing out position on the main spindle axis only by the swinging of the swing arm.

Accordingly, since this transfer motion is carried out only through the swing of the swinging arm, the transfer of a tool is rapid and yet sure.

While the invention has been shown and described with reference to preferred embodiments thereof, it will be apparent that other changes and modifications can be made in the present invention and therefore it is understood that all changes, equivalents, and modification within the spirit and scope of the present invention are here meant to be included.

What is claimed is:

1. A tool changing apparatus for a machine tool having a headstock mounted on a column for movement therealong and a main spindle in said headstock adapted to have a tool inserted into it for a machining operation, said tool changing apparatus comprising a swing arm pivoted on the headstock, a second column adjacent said head stock carrying column, a tool drum mounted on said second column and movable on said second column synchronously with said headstock, said tool drum having means for holding a plurality of tools with the axes thereof at an angle α to the axis of said main spindle, a rotatable shaft on said swing arm, a tool changing arm having tool holding means at each end thereof and mounted on the end of said rotatable shaft, and means on said swing arm supporting said rotatable shaft for rotation and shifting movement along said swing arm, the pivotal mounting of said swing arm on said headstock being adjacent said main spindle axis and slightly offset therefrom so that when the swing arm is parallel to said main axis the tool holding means is aligned with said main spindle axis, whereby movement of a tool from the tool drum to the position of the main spindle axis is by rotation of the rotatable shaft and pivoting of said swing arm through the angle α, and insertion and removal of the tool from the main spindle is by movement of the rotatable shaft along said swing arm.

2. A tool changing apparatus as claimed in claim 1 in which said means for supporting said rotatable shaft is a hollow piston rod, a first cylinder around said piston rod for longitudinally moving said hollow piston rod, and said apparatus further comprises a first bevel gear with which the other end of said shaft is slidably engaged, a second bevel gear with which said first bevel gear meshes, a pinion on said second bevel gear, a rack engaging said pinion, and a double acting cylinder connected to said rack whereby, upon actuation of said double acting cylinder, said tool changing arm is rotated through a small or large angle, while, upon actuation of said first cylinder, said tool changing arm and said rotatable shaft are shifted in its axial direction.

3. A tool changing apparatus as claimed in claim 1 in which said rotatable shaft has a cam on its mid portion, and said apparatus further comprises a gear in which the end of said shaft is slidably engaged, a first cam follower engaging said cam, a first revolving cylinder connected to said cam follower for shifting said shaft axially thereof upon actuation of said revolving cylinder, a second cam having a sector gear on a portion of its periphery, the sector gear being meshed with said gear, a second cam follower engaged with said sector gear for rotating said sector gear, a second rotating cylinder connected to said second cam follower, a rotatably mounted supporting frame for said swing arm on which said second rotating cylinder is mounted, a third rotating cylinder connected to said supporting frame, and a third cam follower engaged with said third rotating cylinder, whereby upon actuation of said third rotating cylinder its rotation is transmitted to said supporting frame and said tool changing arm is rotated through said supporting frame, said second can follower and said gear through a small angle, and upon actuation of said second rotating cylinder said tool changing arm is rotated through said second cam follower and said gear through a smaller angle.

4. A tool changing apparatus as claimed in claim 1 in which said means for supporting said rotatable shaft is a hollow piston rod and a first cylinder around said piston rod for longitudinally moving said hollow piston rod, the apparatus further comprising a first gear with which the other end of said shaft is slidably engaged, a second gear with which said first gear is meshed, a first revolving cylinder connected to second gear for rotating said tool changing shaft through one angle, a second revolving cylinder connected in tandem to said first revolving cylinder for rotating said tool changing shaft through another angle.

References Cited
UNITED STATES PATENTS

| | | | |
|---|---|---|---|
| 3,348,298 | 10/1967 | Sedgwick | 29—568 |
| 3,355,798 | 12/1967 | Drechseler | 29—568 |
| 3,277,569 | 10/1966 | Verhoeven | 29—568 |
| 3,300,856 | 1/1967 | Daugherty | 29—568 |
| 3,458,924 | 8/1969 | Oslebo et al. | 29—568 |

WILLIAM S. LAWSON, Primary Examiner

F. R. BILINSKY, Assistant Examiner